United States Patent [19]
Klauber

[11] Patent Number: 5,358,343
[45] Date of Patent: Oct. 25, 1994

[54] KEYBOARD WITH TRANSVERSELY ACTIVATED NON-ALPHANUMERIC KEYS

[75] Inventor: Robert D. Klauber, Fairfield, Iowa

[73] Assignee: Keyboard Advancements, Inc., Fairfield, Iowa

[21] Appl. No.: 849,533

[22] Filed: Mar. 11, 1992

Related U.S. Application Data

[63] Continuation-in-part of Ser. No. 813,289, Dec. 19, 1991, which is a continuation-in-part of Ser. No. 339,075, Apr. 14, 1989.

[51] Int. Cl.$^5$ .............................................. B41J 5/10
[52] U.S. Cl. .................................. 400/485; 400/488
[58] Field of Search ............... 400/485, 486, 488, 489, 400/473, 472

[56] References Cited

U.S. PATENT DOCUMENTS

| | | | |
|---|---|---|---|
| 2,192,594 | 3/1940 | Brand et al. | 197/11 |
| 4,121,048 | 10/1978 | Dev Choudhury | 400/486 |
| 4,522,518 | 6/1985 | Schmidt | 400/486 |
| 4,769,516 | 9/1988 | Allen | 400/485 |
| 4,795,349 | 1/1989 | Sprague et al. | 434/156 |
| 4,974,183 | 4/1990 | Miller | 400/486 |
| 5,017,030 | 5/1991 | Crews | 400/485 |

FOREIGN PATENT DOCUMENTS

| | | | |
|---|---|---|---|
| 0081186 | 5/1983 | Japan | 400/472 |
| 0651504 | 9/1984 | Sweden | 400/472 |

OTHER PUBLICATIONS

IBM Technical Disclosure Bulletin (vol. 26 No. 2 Jul. 1983 p. 736); (vol. 23 No. 8 Jan. 1981); (vol. 26 No. 7B Dec. 1983 p. 3746); (vol. 28 No. 5 Oct. 1985 p. 1859); (vol. 21 No. 8 Jan. 1979 p. 3261).
Apple Macintosh, Trackball, "A Peck of New Apple Macintoshes", Byte, Nov. 1991, pp. 50-51.
Appoint, Thumbelina advertisement, "Selective Software", Fall 1991, p. 40.
Everex Systems, Inc., Product Review & Manual Section, supplied Feb. 21, 1992.
Everex Systems, Inc, "J" Key advertisement, PC Magazine, Feb. 25, 1992 p. 64.
Outbound laptop System advertising brochure, Sep. 1991.
Zeos International Ltd, Keyboard advertisement, "PC Magazine", Aug. 1991, p. 197.
ISO/IEC 9995-1 &-2 "General Principles governing keyboard layouts, International Organization for Standardization", R. Riess, Jun. 20, 1991.
Kensington Microware Ltd, mouse advertisement, "PC Magazine" Aug. 1991, p. 245.

*Primary Examiner*—Edgar S. Burr
*Assistant Examiner*—Anthony H. Nguyen
*Attorney, Agent, or Firm*—C. Douglas Wingate

[57] ABSTRACT

A method for controlling cursor functions on a touch typing keyboard, comprising activation of the cursor control functions via transverse force applied comfortably by thumb movement. Such activation can be accomplished more easily, more efficiently, and more ergonomically effectively than prior art methods because it can be done without averting the eyes from the text copy and does not entail moving or uncomfortable stretching of the hands.

26 Claims, 4 Drawing Sheets

KEYBOARD WITH TRANSVERSELY ACTIVATED NON-ALPHANUMERIC KEYS

This application is a continuation-in-part of U.S. patent application Ser. No. 07/813,289 entitled "Ergonomic Non-Alphanumeric Key Activation" filed on Dec. 19, 1991 by the present inventor and which itself is a continuation-in-part of U.S. patent application Ser. No. 07/339,075 filed on Apr. 14, 1989 entitled "Ergonomically Effective Backspacing Method".

BACKGROUND OF THE INVENTION

This application references Disclosure Document #277134 entitled "Ergonomic Thumb Activated Keyboard" mailed Mar. 17, 1991 and received in the USPTO on Mar. 22, 1991.

1. Field of the Invention

This invention relates to activation of non-alphanumeric keys including cursor movement keys on keyboards for computers, electronic typewriters, word processors, and the like, and more particularly, to an improved method and apparatus for activation of alphanumeric keys which is easier, more efficient, more ergonomic, and permits the touch typist to activate non-alphanumeric keys without moving the eyes from the text or moving the hands from their accustomed touch typing position.

2. Description of the Prior Art

The standard electronic and computer keyboards of prior art (See FIG. 1) comprise a number of non-alphanumeric keys including "arrow" keys, 12, 14, 16, 18, which cause a cursor (or perhaps a typing mechanism for electronic typewriters) to move around the screen (or paper for electronic typewriters.) These non-alphanumeric keys are located in positions on the keyboard which force the touch typist to avert his or her eyes from the copy to the keyboard in order to locate and use these keys. Further, the typist must change the hand/finger location(s) and/or stretch uncomfortably to activate these keys.

For the arrow (cursor movement) keys, in particular, the typist must change the hand/finger location from one arrow key to another to move in different directions. Typically, the typist must 1) avert the eyes from the copy to the keyboard,
2) remove the hands from their accustomed location,
3) locate and depress the desired arrow key for movement in one direction,
4) if another directional movement is then required, he or she must then move the hand/finger to the next arrow key for movement in a different direction,
5) step 4) may need to be repeated for other arrow keys,
6) look to the keyboard and return hands to original position, and then
7) search the copy to find the proper location to begin inputting again.

This is not only an inconvenience but a waste of valuable time as well. Further, it adds to typist fatigue which can lead directly to lower efficiency and poorer quality work.

This inconvenience, inefficiency, and fatigue is not only generated by activating the cursor movement keys, but by activating virtually all of the other non-alphanumeric keys as well. These other keys include the page up, page down, home, end, backspace/erase, delete, specific function such as F1 through F12, insert, escape, control, alt, backslash, caps lock, and tab keys, as well as function keys F1, F2, etc. Though for reasons of simplicity and efficiency the discussion herein focuses on the cursor movement keys, the inherent limitations of prior art cursor movement keys are applicable to any and all of the other non-alphanumeric keys as well.

Some keyboard designs more recent than that shown in FIG. 1 (see, for example, Sprague et al, U.S. Pat. No. 4,795,349) have moved the cursor movement keys into different locations, yet none of these designs eliminate the problems and inefficiencies hereinabove delineated. Other prior art (see the "Thumbelina" device of Appoint Corporation) show control of the cursor using a cursor ball which may be operated by the thumbs and which functions much like a mouse. Keyboards including such cursor balls also include cursor movement keys, and the cursor ball is not intended as a surrogate for the cursor keys, but merely as an additional means for moving the cursor. Each of the two types of means has advantages over the other, and each is a separate device unto itself. Cursor keys, for example, provide the user with a way to back or forward space one space at a time or move up or down one line at a time in discrete steps rather than with the continuous movement provided by a mouse or cursor ball. The present invention as applied to cursor movement is intended primarily for use in lieu of the traditional cursor keys rather than as a replacement for a cursor ball or mouse.

The invention shown by Crews, U.S. Pat. No. 5,017,030, permits somewhat easier motion of the cursor, but entails learning of a new keyboard layout as well as movement of the thumbs which is not as comfortable or as natural nor which interface as well with the spacebar as that provided by the present invention. In addition, the invention of Crews entails movement of the thumbs between four different keys to activate cursor movement in the four directions. This entails more time consuming and tedious movements than required in the present invention wherein only two keys may be used to provide cursor movement in all four directions. Further, unlike the present invention, Crew's invention docs not use, and cannot accommodate, the traditional spacebar for spacing which is widespread and found in virtually 100% of the keyboards used today. Still further, Crew's invention is not suitable to today's common keyboard and is not likely to be embraced by keyboard users or keyboard manufacturers since it entails such a radical departure from that to which users have become accustomed.

One keyboard made by Everex Systems, Inc. uses the "j" key to move the cursor in lieu of a mouse (in addition to its normal function as the "j" alphanumeric key). Cursor movement is activated by resting a finger on the top face of the "j" key and "gently sliding" the finger in the direction one wishes the cursor to move. This cursor movement key is intended for movement by a finger and has not proven as ergonomic as was originally hoped. The motion needed by the finger to control the cursor is neither as natural or comfortable as it could be, and users have found it less accurate and efficient than they would like. The device is not as easily activated as is the present invention which may comprise pressure on the side rather than top face of a key. In addition, the Everex "j" key is not a "dedicated" key, i.e., it has two functions—one as an alphanumeric key and one as a mouse key—thus making it more cumbersome than the present invention. Further, the device is not a surrogate for the traditional cursor movement keys as may be the present invention, and hence provides continuous mouse-like, rather than discrete cursor movement as may be provided by the invention shown herein.

Another keyboard design by Outbound in its Laptop System personal computer shows a Track Ball TM located below the center of the spacebar. It may be thumb activated but, as will be shown herein, is not as comfortably or as naturally activated as the present invention. Further, it takes up extra space on the keyboard which may not be necessary with the present invention. Such extra space actually forces the manufacturer to make the keyboard larger, entailing extra expense. It also requires extra space by the user to situate the keyboard. In addition, it moves the cursor in the continuous manner of a mouse or cursor ball rather than the discrete step movements supplied by standard cursor keys and which may be supplied by the improved cursor keys of the present invention. Further, it does not take advantage of the natural tendency of the thumbs to provide activation via transverse motion using direct pressure from the face of a thumb rather than traction force from a side of the thumb.

There is therefore, at present, no comfortable, easy means to activate non-alphanumeric keys such as the discrete step cursor (or typing mechanism) movement keys on standard size and design computer or electronic typewriter keyboards without moving the hands from their accustomed touch typing position, stretching of the hands uncomfortably, and/or averting the eyes to look at the keyboard.

OBJECTS AND ADVANTAGES OF THE INVENTION

Accordingly, several objects and advantages of the present novel means for cursor (or typing mechanism) movement are to permit easy, ergonomic, movement of the cursor (or typing mechanism) via thumb movement without having to move the hands to a different location, avert the eyes from the text, stretch uncomfortably, or employ a larger keyboard footprint. This will be less fatiguing on the typist, increase accuracy and efficiency, and provide greater convenience in positioning text within any document.

Other objects and advantages are to permit easy, ergonomic, efficient, and less fatiguing activation of other non-alphanumeric keys such as the home, end, page up, page down, backspace/erase, delete, specific function such as F1 through F12, escape, control, all, tab, caps lock, backslash, function, and insert keys as well.

Further objects and advantages of the invention will become apparent from a consideration of the ensuing description of it.

SUMMARY OF THE INVENTION

The invention solves the basic problem of cursor (or typing mechanism) movement associated with prior art keyboards by providing at least one cursor movement key or other type of actuator, (typically within reach of the thumbs) that may be comfortably activated (typically by the thumbs) without moving the hands from the standard touch typing position. (As used herein, the term "within reach" shall mean within comfortable reach such that the key(s) or other similar actuator(s) be activated without uncomfortable stretching or moving of the hands.) This is done by using key(s) or other type of actuator(s) which are activated by sideways or "transverse" pressure on a side (or face) of said key(s) or actuator(s) which may be other than the top side (or face). (The "transverse" direction shall mean any direction other than downwards.) The invention may also be enhanced by incorporating more than one cursor movement direction function in a single key (actuator). Further, the invention may also applied to solve the same basic problem as it applies to other non-alphanumeric keys.

The present invention, in one embodiment, comprises a keyboard with two transversely activated keys, one which may be within reach of the touch typist's right thumb and the other which may be within reach of the typist's left thumb. Either activated key may have more than one cursor movement function. In one embodiment, pressing down on the right thumb activated key would move the cursor (henceforth "cursor" shall also refer to "typing mechanism") to the right. Pushing forward on it from the front face (the side of the key facing the typist) would cause the cursor to move downward. (From henceforth "forward" will refer to motion of, or pressure on, the key such that said motion or pressure is directed away from the typist.) Pressing down on the left thumb activated key would move the cursor to the tell; pressing it forward would move the cursor upward. In other variations of the invention, any particular cursor movement function may be activated by any one of the aforementioned directionally applied pressures on either of the two keys.

In another embodiment, the two keys are raised such that their heights are somewhat higher than one or more other keys. In this embodiment right sideways pressure on one of the keys (typically the right key) causes the cursor to move rightward. Sideways pressure on the other key causes the cursor to move leftwards. Forward pressure on one of the keys causes the cursor to move up; forward pressure on the other key causes it to move down. Alternatively, downward pressure on the keys may result in up and down cursor movement.

The home and end keys may be incorporated in another embodiment. Downward motion may be used on one key for the home function; downward motion on the other for the end function; forward motion on the keys for up and down motion as in other embodiments; and left/right pressure on raised keys for right/left motion. In another embodiment, the forward and downward pressure, activations may have their functions exchanged front that described herein.

Typically, but not necessarily, the two keys would be located on opposite sides of the spacebar and the spacebar would be shortened from that which has been the typical spacebar length in prior art keyboards.

Other functions such as home, end, page up, page down, backspace/erase, delete, specific function such as F1 through F12, escape, insert, tab, caps lock, control, alt, backslash, and specific functions (F1, F2, etc.) may also be incorporated into any of the keys in lieu of, or in addition to, the cursor movement functions as described herein.

Other embodiments comprise use of one or more levers or "joy stick" type actuators which may, in some applications, be manipulated via thumb movement.

Any touch typing keyboard wherein one or more actuators ("actuator" from henceforth shall refer to any apparatus, such as a key, lever or the like, which performs similar function as a key, i.e., it actuates a function) are used to activate one or more cursor movement functions via pressure other than downward which may be on faces of the actuator(s) other than the top face, whether or not said actuator(s) are activated by thumb movement, comprises the present invention. The invention also comprises any touch typing keyboard wherein any other non-alphanumeric function(s) is (are) activated via pressure other than downward which may be on side (other than top) faces of actuator(s) whether or not said actuators are activated by thumb movement.

The invention, in its various embodiments, solves the problems associated with prior art in a superior and wholly satisfactory manner.

DETAILED DESCRIPTION OF THE INVENTION

Figure 1:
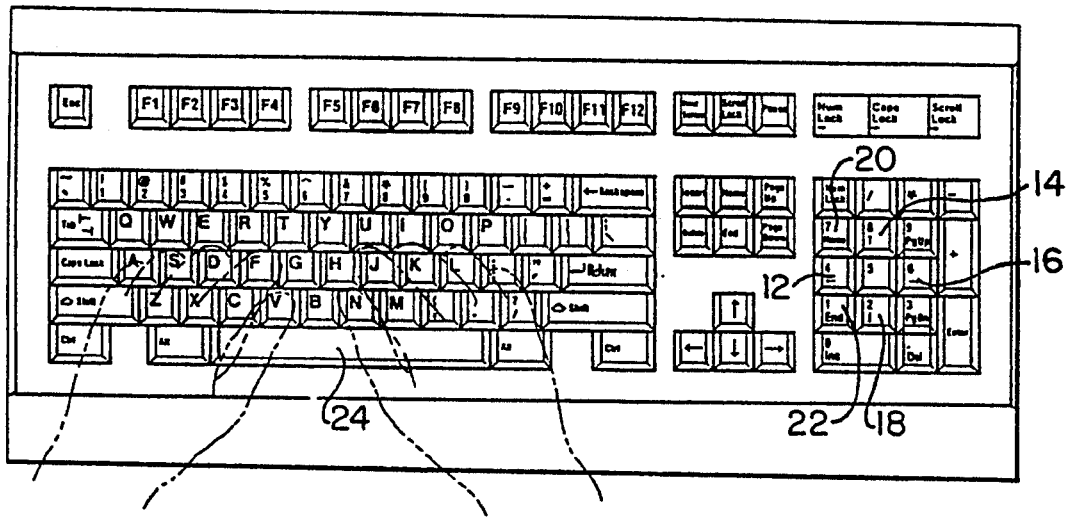
FIG. 1 depicts a standard prior art keyboard showing typical locations for the cursor movement, home, and end keys.

Previous art keyboards such as that shown in FIG. 1 have not provided a simple, ergonomic, effective means whereby the touch typist could move the cursor around the document being prepared. Cursor movement was not possible without averting the eyes from the copy, moving at least one hand from its accustomed location, and/or unnatural stretching or motion of the hands. Cursor movement keys such as keys 12, 14, 16, 18, 20, and 22 have traditionally been located far from the touch typist's normal hand position. Because each cursor movement function is activated by a separate key, it is not possible in such designs to position the cursor movement keys within close proximity of the touch typist's hands. Further, prior art does not take full advantage of the thumbs by permitting them to do additional jobs beyond that of forward spacing. The present invention, in different embodiments, involves alternative keyboard design(s) which provide ergonomic activation of cursor movement not provided by prior art keyboards.

Prior art keyboards such as that shown in FIG. 1 have also not provided ergonomic, efficient means whereby the touch typist could activate other non-alphanumeric functions other than cursor movement. The present invention also solves this and other problems associated with prior art.

EMBODIMENT 1

Figure 2:
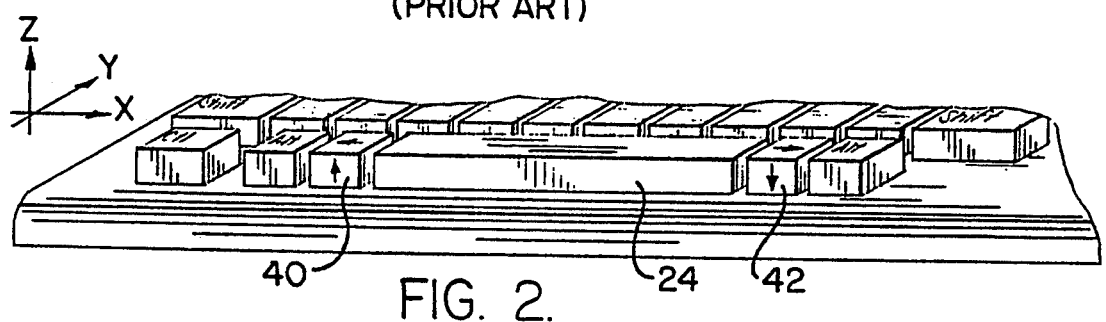
FIG. 2 depicts one embodiment of the present invention with cursor movement keys having normal key height.

The first embodiment is illustrated in FIG. 2. It comprises left/up cursor movement key 40, and right/down cursor movement key, 42 within reach of the thumbs of a touch typist. (As used herein, the term "within reach" shall mean within comfortable reach such that the key(s) or other similar actuator(s) be activated without uncomfortable stretching or moving of the hands.) In this embodiment the keys are situated on either side of the spacebar key, although that is but one possible configuration and is not necessary for the functioning of the invention. The cursor movement keys 40, 42 may be located anywhere on the keyboard although a preferred location is that shown in FIG. 2.

Depressing left/up cursor movement key 40 downward causes the cursor to move leftward, typically with the same discrete type control as found on the traditional left cursor movement key found on standard alphanumeric keyboards. Pushing the left/up cursor movement key 40 forward (i.e., in the direction away from the typist in the positive "Y" direction as shown in FIG. 2) causes the cursor to move upward, typically with a discrete type control sensitivity similar to that found on traditional up cursor movement keys.

Depressing right/down cursor movement key 40 downward causes the cursor to move rightward, typically with the same discrete type control as found on the traditional right cursor movement key found standard alphanumeric keyboards. Pushing the right/down cursor movement key 40 forward (i.e., in the "Y" direction as shown away from the typist) causes the cursor to move downward, typically with a discrete type control sensitivity similar to that found on traditional down cursor movement keys. (As used herein, "transverse" direction shall mean any direction other than downward, i.e., other than in the negative "Z" direction shown in FIG. 2 and other figures. Forward with regard to thumb or finger movement shall mean the positive "Y" direction as shown in FIG. 2 and other figures. Left shall mean the negative "X" direction; right, the positive "X" direction.)

The functions may be interchanged in any possible way. For example, key 40 may be a left/down key with forward ("Y" direction in FIG. 2) pressure activating downward motion of the cursor rather than upward motion. Key 42 may then be a right/up key with forward pressure activating upward motion of the cursor rather than downward motion. Pressure towards the typist (in the negative "Y" direction), rather than away from the typist may be used in lieu of any of the pressures (or motions) described in this or any embodiment shown or implied herein. Similarly any downward pressure or motion on any key may cause up or down movement of the cursor; and any forward pressure on any key may cause right or left movement of the cursor. For example, downward pressure on the left key may cause rightward movement of the cursor, and downward pressure on the right key may cause leftward movement of the cursor.

In FIG. 2 only one function may be activated by a key such as 40 or 42 rather than two. For example, downward pressure on keys 40 and 42 may do nothing, whereas forward pressure on 40 may be a cursor left, and forward pressure on 42 may be a cursor right.

Activation of keys or other actuators such as levers or "joy sticks" in all embodiments may be accomplished by such means as that employed on typical keyboards or with electronic games. These may be switches or contact elements or pads, or any means such as those normally used on keyboards or any other means. Such activation means are both well known and trivial to those skilled in the art. The invention is not limited by the type of activation employed, but encompasses all possible means for key or other actuator activation.

EMBODIMENT 2

A second embodiment entails keys 50 and 52 (shown in FIG. 3) which serve similar purposes as the keys described in embodiment 1 but are "raised" keys such that their height is greater than that of other keys in close proximity. Alternatively, keys 50 and 52 may be normal height with one or more other keys (such as the spacebar key) in their vicinity lowered in height.

In the present embodiment, pushing left/up cursor movement key 50 to the left (in the negative "X" direction in FIG. 3) may cause the cursor to move leftward, typically with the same discrete type control as found on the traditional left cursor movement key found on standard alphanumeric keyboards. Pushing the left/up cursor movement key 50 forward (i.e., in the positive "Y" direction away from the typist) may cause the cursor to move upward, typically with a discrete type control sensitivity similar to that found on traditional up cursor movement keys.

Pushing right/down cursor movement key 52 to the right (in the positive "X" direction) may cause the cursor to move rightward, typically with the same discrete type control as found on the traditional right cursor movement key found on standard alphanumeric keyboards. Pushing the right/down cursor movement key 52 forward (positive "Y" direction) may cause the cursor to move downward, typically with a discrete type control sensitivity similar to that found on traditional down cursor movement keys.

Figure 3:
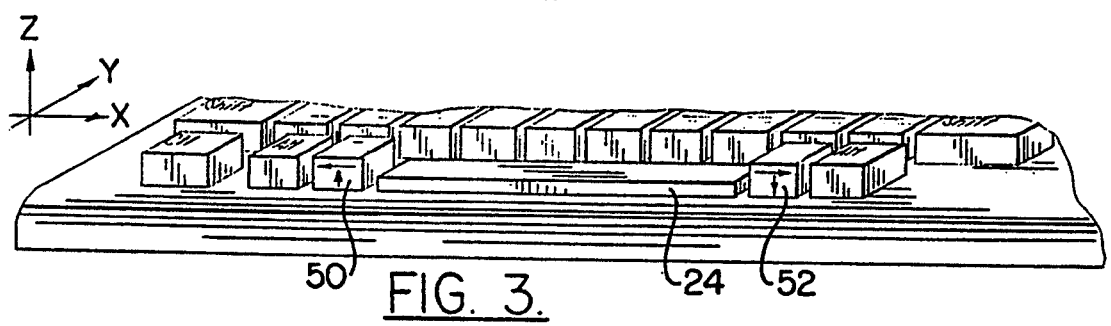
FIG. 3 shows another embodiment of the present invention with cursor movement keys having raised heights.

It should be noted that the raised keys 50, 52 described herein, as shown in FIG. 3, occupy a spatial region above the standard keyboard which is typically not intersected by the hands, or any part of the hands including the fingers and thumbs, during normal usage by a touch typist. This is an advantage of the present invention in that additional commonly used keys may be placed within comfortable access of the touch typist in such a way that they occupy a region of space which heretofore has not been considered by prior art. No change in methodology of typing is required by the typist, nor is any major re-design of the keyboard. Yet a valuable feature is added which can aid the touch typist considerably.

The functions described may be interchanged in any possible way. For example, key 50 may be a left/down key with forward (positive "Y" direction) pressure activating downward motion of the cursor rather than upward motion. Key 52 may then by a right/up key with forward ("Y" direction) pressure activating upward motion of the cursor rather than downward motion. Pressure towards the typist, rather than away from the typist may be used in lieu of any of the pressures (or motions) described in this or any embodiment shown or implied herein. Similarly any leftward pressure or motion may be used in place of any rightward pressure or motion or vice versa.

Keys 50 and 52 may in alternative variations of the invention be normal height and yet have spaces between them and other keys such that one or more of their functions may be activated by sideways motion. Such sideways motion may be forward (positive "Y"), back (negative "Y"), left (negative "X"), right (positive "X"), or some combination of those directions. Further, as in embodiment 1 and all other embodiments, each of keys 50 and 52 may have only one function. That is, only sideways (transverse) pressure on one face may activate a function, whereas pressure in any other direction may not activate any function.

EMBODIMENT 3

The Preferred Embodiment

Figure 4:
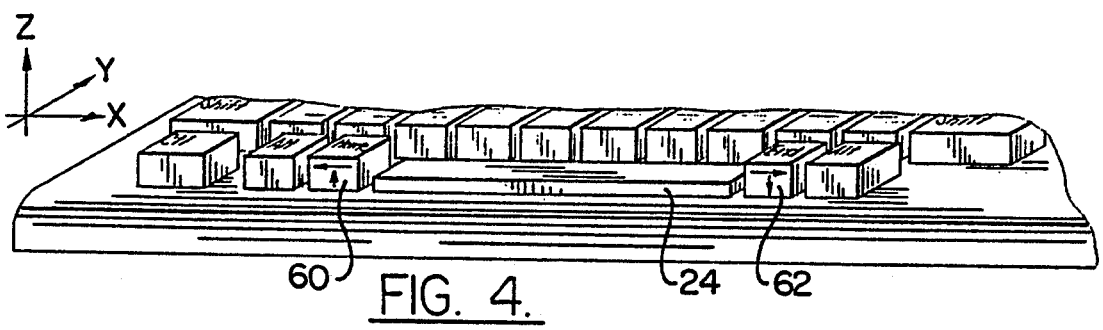
FIG. 4 shows another embodiment of the present invention incorporating the home and end functions.

FIG. 4 illustrates a third embodiment of the invention in which keys 60 and 62 function like keys 50 and 52 of embodiment 2 except that they have the additional functions of "home" and "end" incorporated. In one application the home and end functions are activated by depression of keys 60 and 62 respectively. The functions of home and end could obviously be reversed as well such that they are activated by depressing 62 and 60 respectively.

Any possible means for activating the six functions of left cursor, right cursor, up cursor, down cursor, home, and end in two keys is comprised by the present invention. For instance, any possible directional pressure may be applied on either of the keys 60 and 62 to effect any of the aforementioned six functions. The labeling shown in FIG. 4 represents therefore only one possible set of ways for which activation of the six functions is possible. The configuration shown in FIG. 4 is, however, the preferred embodiment for the invention.

EMBODIMENT 4

Figure 5:
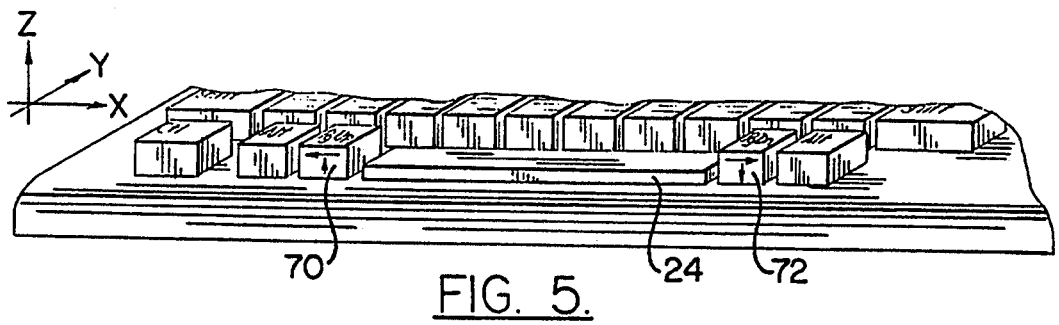
FIG. 5 shows another embodiment of the present invention incorporating the page up and page down functions.

FIG. 5 shows a fourth embodiment of the invention in which keys 70 and 72 function like keys 60 and 62 of embodiment 3 except that they have the functions of "page up" and "page down" incorporated in lieu of the "home" and "end" functions. In one application the page up and page down functions are activated by depressing keys 70 and 72 respectively. The functions of page up and page down could obviously be reversed as well such that they are activated by depressing 72 and 70 respectively.

Any possible means for activating the six functions of left cursor, right cursor, up cursor, down cursor, page up, and page down in two keys (or other type of actuator) is comprised by the present invention. For instance, any possible directional pressure may be applied on either of the keys 70 and 72 to effect any of the aforementioned six functions. The labeling shown in FIG. 5 represents therefore only one possible set of ways for which activation of the six functions is possible.

EMBODIMENT 5

Figure 6:
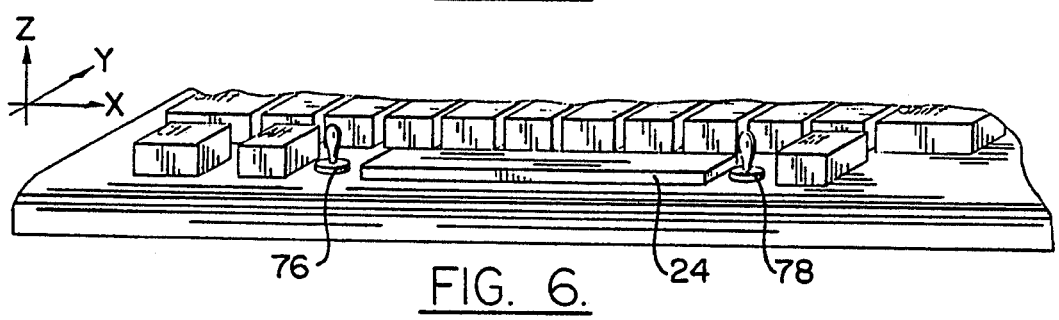
FIG. 6 shows another embodiment of the present invention with levers or "joy stick" type actuators controlling the cursor movement.

FIG. 6 shows another embodiment of the invention wherein a lever or "joy stick" type actuator may be used instead of a key to cause any of the eight functions of cursor up, cursor down, cursor left, cursor right, home, end, page up, or page down. As but one example, left pressure (negative "X" direction) on lever 76 may cause left movement of the cursor; forward ("Y" direction) pressure on lever 76, upward movement; right (positive "X" direction) pressure on lever 78, right movement; and forward ("Y" direction) pressure on lever 78, down movement.

As in other embodiments, any particular directional pressure on either lever, may cause any of the eight cursor and page movement functions delineated elsewhere herein to be effected; As a variation of this embodiment, any number of one or more levers may be used for such functions. For instance, lever 78 may be used completely for cursor movement with pressure in each of four different directions effecting cursor movement in each of four different directions (e.g., right pressure yielding right cursor movement; left pressure, left cursor movement; forward pressure, up cursor; and backward or down pressure, down movement.) Lever 76 may then be used for the four functions of home, end, page up, and page down in similar fashion. Alternatively, the functions of the two levers may be reversed.

If downward pressure is used, levers 76 and/or 78 may have flattened tops or additional fixtures on their uppermost end which more readily accommodate downward application of pressure by a finger, thumb, or other part of a hand. Downward pressure activation on either of said keys may then activate yet another non-alphanumeric function much in the manner of embodiment 4.

It is preferred that activation of the levers in this embodiment be done by one or two thumbs, but that is not essential to the functioning of the invention.

EMBODIMENT 6

Figure 7:
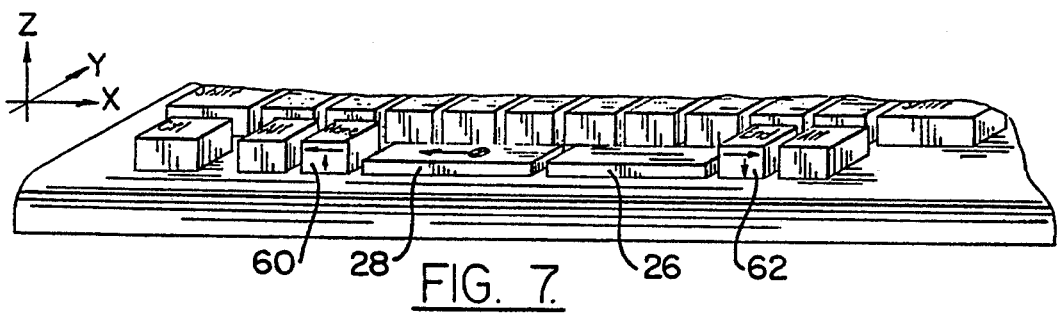
FIG. 7 shows yet another embodiment wherein the present invention is combined with a prior invention of the present inventor wherein the backspace/erase function is thumb activated.

FIG. 7 illustrates the incorporation of the present invention with the invention shown by the present inventor in U.S. patent application Ser. No. 07/339,075. Key 28 is the thumb activated backspace/erase key shown in that application. Key 26 is a spacebar shortened and located so as to accommodate ergonomic placement of the backspace/erase key 28. Keys 60 and 62 are those described herein in embodiment 3. Keys other than 60 and 62 shown elsewhere herein in other embodiments or other actuators such as the levers 70 and 72 shown in embodiment 5 may be used in lieu of keys 60 and 62. That is, any embodiment shown herein may be combined with any the embodiment shown in U.S. patent application Ser. No. 07/339,075. Further, key 28 may have any other non-alphanumeric function such as those shown in the U.S. patent application entitled "Ergonomic Non-Alphanumeric Key Activation" filed Dec. 19, 1991 of which the present application is a continuation-in-part.

EMBODIMENT 7

Figure 8:
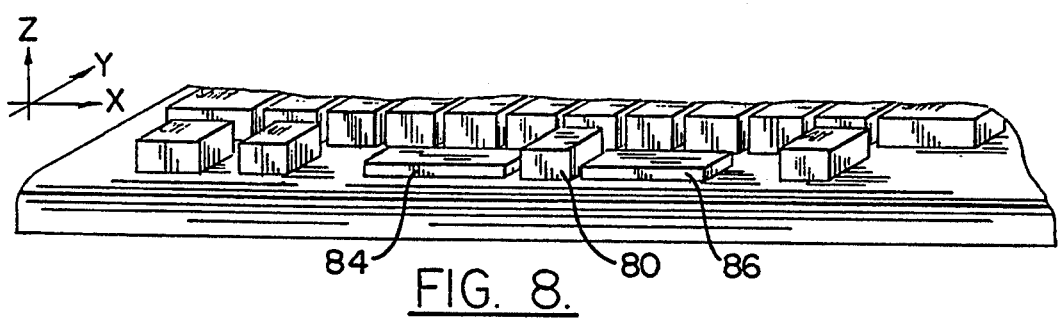
FIG. 8 shows another embodiment of the present invention with a single key controlling the cursor movement keys wherein the keys on either side of the lever may both be spacebars or, alternatively, one may be a spacebar and one a backspace/erase key.

FIG. 8 shows yet another embodiment of the invention wherein a single key 80 may be employed to activate one or more of the eight functions of cursor up, cursor down, cursor right, cursor left, home, end, page up, and page down. Typically, the single key 80 would be located between the thumbs when the hands are in the standard touch typing position, but that is not essential for the functioning of the invention. In the configuration shown in FIG. 8, the keys 84 and 86 could either both be spacebars or one could be a spacebar and one another non-alphanumeric key such as a backspace/erase key like key 28 shown in FIG. 7.

In one variation of this embodiment, leftward pressure (negative "X" direction) on key 80 could effect leftward cursor movement; rightward (positive "X" direction) pressure, rightward cursor movement; forward ("Y" direction) pressure, upward cursor movement; and downward pressure (negative "Z" direction), downward cursor movement. In this configuration either thumb may used to activate a particular function, though it may be preferred to have leftward pressure delivered by the right thumb and rightward pressure delivered by the left thumb.

Other possibilities would be apparent to those skilled in the art. For example, backward pressure (pressure towards the typist) may be employed for downward cursor movement or any other of the aforementioned eight functions; Downward pressure may be used for home or end or page up or page down; etc.

EMBODIMENT 8

Figure 9:
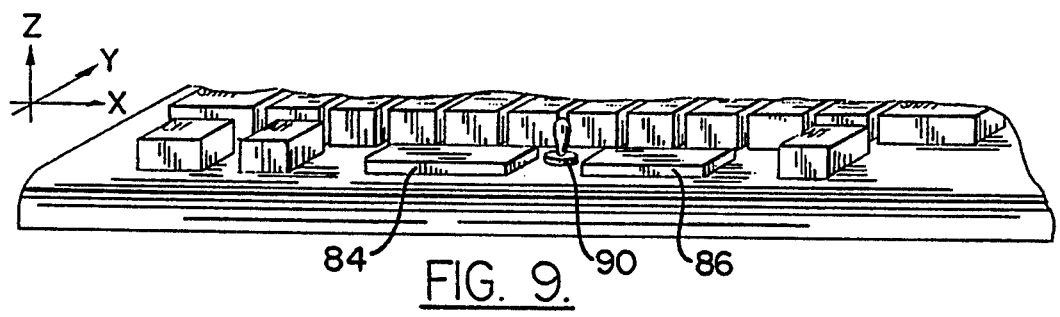
FIG. 9 shows another embodiment of the present invention with a single lever or "joy stick" type actuator controlling the cursor movement keys wherein the keys on either side of the lever may both be spacebars or, alternatively, one may be a spacebar and one a backspace/erase key.

Embodiment 8 is shown in FIG. 9 and is similar to embodiment 7 except that lever 90 may be employed instead of key 80. Lever 90 functions much like levers 70 and 72 and may activate any of the aforementioned eight functions via pressure in any particular direction. By way of example, one of the variations of embodiment 8 comprises leftward (negative "X" direction) pressure on lever 90 for left cursor movement; rightward (positive "X" direction) pressure for right cursor movement; forward (positive "Y" direction) pressure for upward cursor movement; and backward (negative "Y" direction) pressure for downward cursor movement. Other possible variations are obvious to those skilled in the art, and the invention is not limited to the configurations explicitly shown herein.

EMBODIMENT 9

Figure 10:
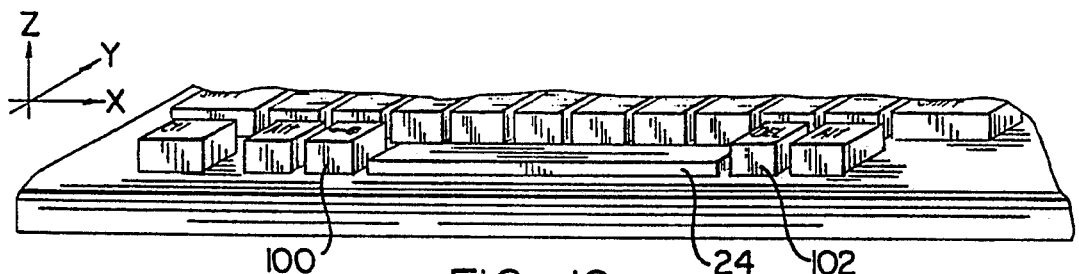
FIG. 10 shows another embodiment of the invention wherein the backspace/erase and delete keys are incorporated.

FIG. 10 shows one of many other possible embodiments in which non-alphanumeric functions other than the cursor movement functions may be activated via directional pressure other than downward. Key 100 may function as a backspace/erase when pressure is directed leftward on it; key 102 may function as delete when pressure is directed rightward on it. Key 24 may be the standard spacebar. Key 100 may in some embodiments may function alone without having a key such as 102, and vice versa. The two keys could also have their roles reversed. Either key may have its function activated by pressure in other directions, such as downward or forward as well. In addition, key 100 or key 102 may perform other non-alphanumeric functions such as any of those described herein in addition to backspace/erase and delete. By way of example, but not by way of limitation, key 100 may also effect left cursor movement by downward pressure, and up cursor movement by forward pressure; key 102 may effect right cursor movement by downward pressure, and down cursor movement by forward pressure.

EMBODIMENT 10

In another embodiment, other key(s) than those focused on in the prior discussion may take on additional non-alphanumeric functions. For example, in FIG. 2, forward ("Y" direction) pressure on the spacebar 24 may effect any other alphanumeric function. In one variation forward pressure on spacebar 24 may effect backspace/erase. In other variations, it may effect delete or home or page up or any other non-alphanumeric function.

Key 24 as shown in all other Figures may take on any of these functions by application of a directional pressure other than downward.

Figure 11:
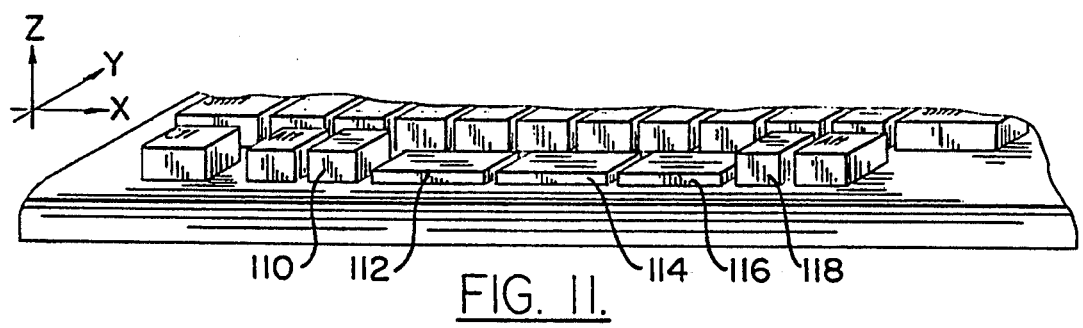
FIG. 11 shows a combination of the present invention with prior art disclosed in a patent application of which the present application is a continuation-in-part.

In FIGS. 7, 8, and 9, the keys 26, 28, 84, and 86 may take on any additional non-alphanumeric functions which may be activated by directional pressure other than downward. For example, in FIG. 7, forward ("Y" direction) pressure on key 26 may cause tab to be activated; forward pressure on key 26 may cause delete to be activated. Alternatively, forward pressure on key 28 may cause delete to be activated. Identical logic as applied herein to keys 26 and 28 may be applied to keys 84 and 86. The logic may be carried even further and applied to any of the embodiments of U.S. patent application "Ergonomic Non-Alphanumeric Key Activation" of which this application is a continuation-in-part. Any of the keys shown in that application may be activated via pressures in directions other than downward to effect any non-alphanumeric function(s). By way of example but not by way of limitation, FIG. 11 shows one embodiment of the aforementioned patent application combined with an embodiment of the present invention wherein the keys 110, 112, 114, 116, 118 may effect any combination of non-alphanumeric functions activated via any of the means discussed herein or in the referenced patent application. Each of the keys shown in FIG. 11 may have a particular function when force is applied on it in a given direction. It may then have another function when force is applied in the same direction but another key (or other actuator) such as the alt, control, or shift key is activated simultaneously. Each key may also have different functions when force is applied in different directions for each of the cases wherein i) no additional key is activated simultaneously, ii) the control key is activated simultaneously, iii) the alt key is activated simultaneously, iv) the shift key is activated simultaneously, v) any other key or other actuator is activated simultaneously.

The additional key (or actuator) referred to herein may be activated sequentially instead of simultaneously.

Those skilled in the art will readily realize that a large number of possible combinations exist when the methods of different directional activation pressures and changeable function activated by simultaneous or sequential depression of two keys (or other actuators) are combined. The reader will readily see that such large number of possible combinations permits a standard touch typing layout keyboard to offer touch typing access to all of the non-alphanumeric actuators. This is of extraordinary advantage to touch typists, since it will permit them to touch type input all of the keystrokes they commonly use, not merely that of the alphanumeric keys. All possible combinations referred to hereinabove are comprised by the invention.

OTHER EMBODIMENTS

Combinations of any of the embodiments described hereinabove are comprised by the invention. For example, incorporation of the eight functions of up cursor, down cursor, left cursor, right cursor, home, end, page up, and page down into one or more actuators such that any of the those eight functions may be activated by different directional pressures is within the scope of the invention. In addition, any number of the aforementioned eight functions may be incorporated into a single actuator. As but one of many possible examples, only the home and left cursor movement function might be activated by different directional pressures on a single actuator with no other functions performed by that actuator. In addition, the functions of backspace/erase and delete may be incorporated in addition to, or in lieu of, any of the aforementioned eight functions. For example, in FIG. 4, the home and end functions of keys 60 and 62 may be replaced by the backspace/erase and delete functions, respectively. Many other possibilities with the backspace/erase and delete functions are comprised by the invention and would be obvious to those skilled in the art. For example, leftward pressure on the key 60 in FIG. 4 may activate backspace/erase; rightward pressure on key 62 may activate delete. Downward pressure on key 60 may then effect left cursor movement; downward pressure on key 62, right cursor movement. Such leftward pressure to activate backspace/erase may be used in any embodiment. Rightward pressure to activate delete may be used in any embodiment. The functions normally activated by rightward and leftward pressure in those other embodiments may then be activated via other means or may be activated by directional pressures shown in those other embodiments to activate other functions. Using configurations such as, or related to, any of those shown in, or implied by, any embodiments or figures wherein only a single function is activated per actuator is also comprised by the invention. For example, in FIGS. 3, 6, 7, 10, 11 only leftward pressure on the leftmost transversely activated key may activate a function (such as cursor left) with pressure in other directions having no effect. Similarly, the rightmost transversely activated key may activate a function (such as cursor right) when pressure is directed rightward with pressure in other directions having no effect.

Further, the use of levers described hereinabove may be applied to use of keys and vice versa. For example, a key may be pressed in any of the four directions of right, left, forward ("Y" direction), or backward as is described in embodiments 5 and 8. Also a lever may be pressed downward as is described in the embodiments showing keys. Any other actuator which can effect the same result as a key or lever may be substituted in any embodiment, whether implied or expressed, of the invention.

The invention comprises a keyboard with alphanumeric keys arranged according to touch typing position wherein one or more non-alphanumeric functions may be activated by pressure other than downwards (i.e., in a transverse or "sideways" direction) on any one or more key(s) or similar actuator(s). It also comprises any of the embodiments expressed or implied herein wherein any of such actuators may be ergonomically activated by (i.e., is within reach of) one or more thumbs with one or two hands in touch typing position. The non-alphanumeric functions comprised by the invention comprise cursor right, cursor left, cursor up, cursor down, home, end, backspace/erase, delete, insert, backslash, caps lock, tab, control, alt, specific functions such as F1, F2, etc., caps lock, and/or escape.

Actuator Structure

The electromechanical means for activating each function, i.e., the "switching" or other means, for sending the appropriate signal to the computer when a given actuator is activated is not relevant to the working of the invention. Such means are common, and are both trivial and well known to those skilled in the art. The present invention involves novel placement and application of transverse directional pressure of said actuators and comprises any appropriate electromechanical means for activation.

Figure 12:
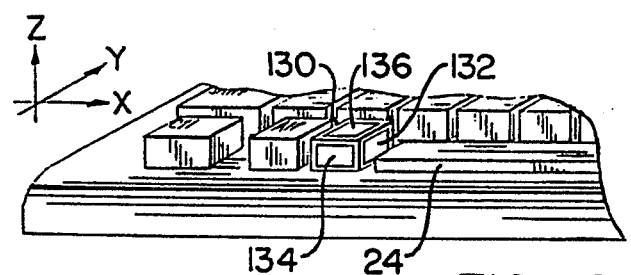
FIG. 12 illustrates one of many possible key structural designs which are comprised by the present invention.

Transverse pressure application is exceedingly commonplace for activation of "joy stick" or lever actuators. While transversely actuated keys are less common, means for electromechanical activation for such keys would be obvious to those skilled in the art. Many such designs are possible. FIGS. 12 and 14 illustrate two particular means for multiple directional pressure activation of keys.

FIG. 12 shows a raised key with capability for activation on three faces: the front face (facing the negative "Y" direction with pressure to be applied in the positive "Y" direction), the right face (facing positive "X", pressure applied in negative "X" direction), and the top face (pressure applied downward in negative "Z" direction.) In this configuration, the key housing 130 itself does not move. Located on each face is a simple pressure switch which closes the appropriate circuit when depressed by bringing two internal contacts (not shown) together. Such switches are well known and may be implemented straightforwardly by those skilled in the art. The "X" face has switch element 132; the "Y" face, switch element 134; and the "Z" face, switch element 136. Switch 132 may be located above the spacebar 24 as shown. The appropriate circuit to be closed may be the same as those already found on innumerable prior art keyboards and which are used to effect activation of the appropriate non-alphanumeric function. Designs which provide activation on more or less faces than three, for more or less functions than three, are obvious variations on the configuration of FIG. 12, merely requiring more or fewer switches.

FIG. 14 shows a second possible means for activation of functions by pressures other than downwards. FIG. 14a shows key housing 140, spacebar 24, and rigid element 160 extending from keyboard frame 200. In FIG. 14b, key housing 140 is cut away to reveal positioning element 142 along which the key housing 140 slides without resistance in the vertical ("Z") and left/right ("X") directions. Positioning element 142 pivots on rod 150 which rides in the holes of support elements 146. Support elements 146 are rigidly attached to keyboard frame 200. Torsional spring 148 is attached on one end to rod 150 and on the other end to keyboard frame 200. Conducting elements 154 and 156 are the two sides of a switch which closes when key housing 140 pivots forward via rod 150 allowing elements 154 and 156 to come into contact. 154 may be composed of two parts, 154a and 154b (see FIG. 14d), attached to rigid element 152 which in turn is attached to keyboard frame 140. Circuit lead wires 162 and 164 are attached to each of 154a and 154b. Element 156 is one solid conducting piece extending in the "X" direction from the rightmost side (as shown in FIG. 14d) of element 154b to the leftmost side of element 154a. When pressure is applied to the housing 140 in the forward ("Y") direction, element 156 comes into contact with both sides of element 154, thereby completing the appropriate circuit linked through leads 162 and 164 and permitting a specific function related to that circuit to be activated. The circuitry employed may be the same as that of any of the many prior devices well known to those familiar with keyboard art.

Leftward pressure (negative "X" direction) on the housing 140 may be resisted by a spring loaded switch (hidden and not shown in FIG. 14) mounted between housing 140 and rigid element 160. Rigid element 160 is attached to the keyboard frame 200. This switch does not resist motion in any direction other than leftward and save for its spring may be similar in construction to that shown in FIG. 14c or of any suitable prior art type. Key housing 140 slides without resistance in the slot within it along positioning element 142. The spring loaded switch between elements 160 and 140 provides resistance to negative "X" direction motion and also provides the contact connection for a second circuit which effects activation of another function. The spring may be typical of most springs in that it resists motion only along one axis (the "X" axis here.) Alternatively, the switch for "X" direction activation may be structurally similar to that of element 154 and 156 for "Y" direction activation shown in FIGS. 14b, 14c, and 14d. In that configuration, a uni-directional spring may be used between elements 140 and 160 which resists motion only in the "X" direction.

Downward (negative "Z" direction) pressure is resisted by a third spring loaded type switch (shown in FIG. 14c but not shown in FIG. 14b) such as those currently used in present day keyboards. As with most springs, this spring does not resist motion in any direction except one (the "Z" direction here.) This third switch may activate yet another function in the same manner as the other two switches activate their respective functions. Alternatively, the "Z" direction switch could be structured in the manner of the "Y" direction switch shown in FIGS. 14. A conducting strip on the key housing 140 similar to 156 could then contact two separate strips on the frame 200 when the key housing 140 is depressed. Each of these separate strips would have leads permitting closing of the appropriate circuit and resulting in activation of the desired function via standard prior art keyboard circuit technology. A "Z" direction spring with no appreciable resistance in the "Y" and "X" directions may be employed.

Elimination of the capability of activating a function in any one of the three directions shown in FIG. 14 to provide a key which activates in only two directions is a trivial modification of the structure shown.

ADVANTAGES OVER PRIOR ART

This invention can thus be seen to solve all of the problems delineated in the "Description of Prior Art" section presently associated with non-alphanumeric key activation in a simple and novel manner.

While the above description contains many specificities, the reader should not construe these as limitations on the scope of the invention, but merely as exemplifications of preferred embodiments thereof. Those skilled in the art will envision many other possibilities that are within its scope. For example any of the embodiments may use any shape, dimensions, or number of actuators located in many different locations. The actuators and the keyboard may be of any material, size, and shape, so long as said keyboard is an alphanumeric keyboard such as those which may be used by touch typists.

Figure 13:
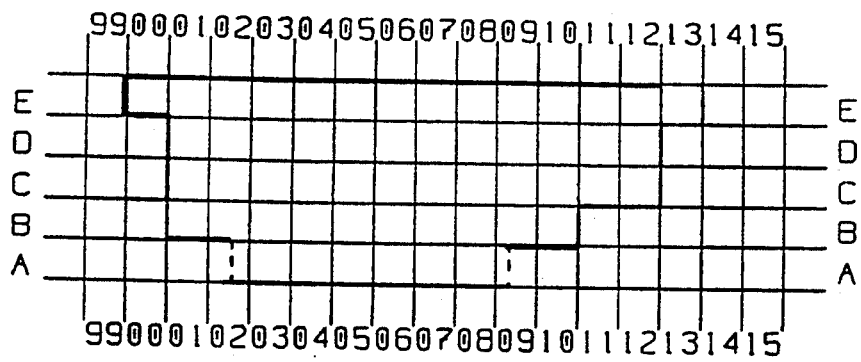
FIG. 13 shows the prior art keyboard grid numbering scheme figure published by the International Organization for Standardization wherein each column is designated by a two digit number and each row by a letter.
Figure 14A:
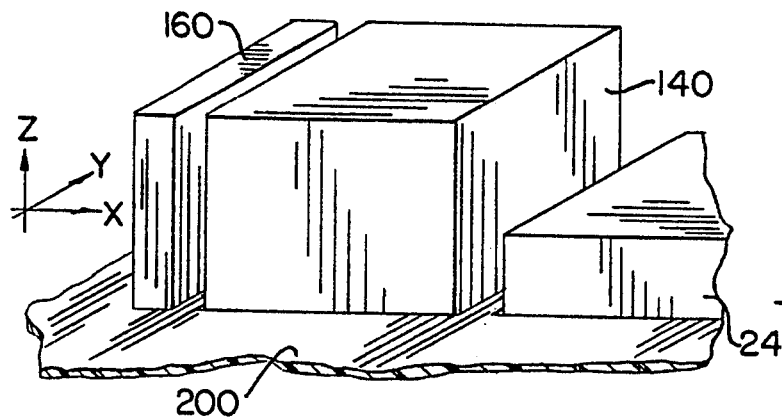
FIGS. 14A, 14B, 14C and 14D illustrate other possible key structural designs which are comprised by the present invention.
Figure 14B:
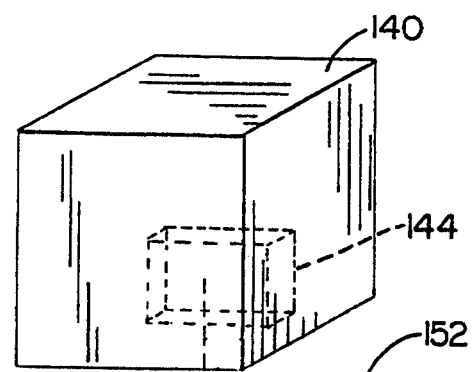
Figure 14C:
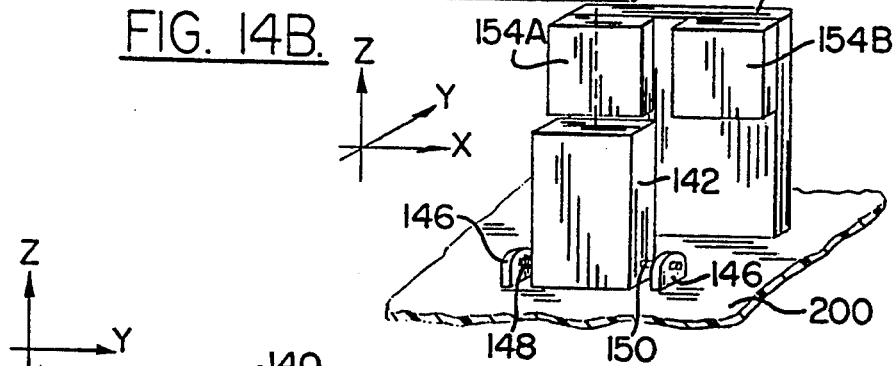
Figure 14C:
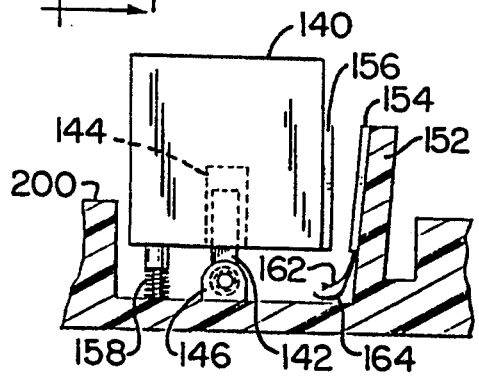
Figure 14D:
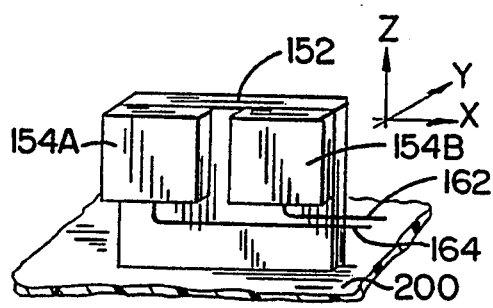

In the standard keyboard for which the ISO standards are being formulated by the International Organization for Standardization the rows and columns are designated via a grid (see FIG. 13) in which two digit numbers are used for columns and letters are used for rows. The spacebar in a standard keyboard version being considered for the ISO standards is located in the A row from columns 03 to 07, i.e., from A03 to A07. The present invention is not limited to the standard keyboard addressed by the ISO standards keyboard as referenced by FIG. 13. However, in keyboards wherein the alphanumeric keys are arranged according to a proposed or eventually accepted ISO standard, the non-alphanumeric key(s) or other actuator(s) which may be transversely activated according to the present invention may be located anywhere in whole or in part on the A row within comfortable reach of one or two thumbs. Typically, such non-alphanumeric actuator location(s) according to the present invention may be anywhere, in whole or in part, within the region A03 to A07, i.e., the location of the standard spacebar in conventional (ISO standard) keyboards. One or more may also be located anywhere else partially intersecting or entirely contained within the A row as well as anywhere below the A row (nearer the typist than the A row). Typically, such transversely activated actuators may be situated, in whole or in part, between columns 01 and 12. For example, in FIG. 2 key 40 may extend, at least in part, over regions A03, A04, and/or A05 It may even extend over A02 and/or A06. In principle, the spacebar 24 may be shortened or moved somewhat in order to accommodate the transversely activated actuators described herein in any suitable configuration. Typically, it may be preferred to locate such actuators within comfortable reach of the thumbs of a touch typist having hands located in touch typing position. In ISO standards type keyboards, this may in whole or in part intersect the A row, or the AA row defined hereinbelow. Row and column designations for embodiments with other numbers and/or locations of transversely activated non-alphanumeric keys (or other type of actuator) shown in the figures are obvious. In some embodiments, a row under the A row is employed and, for present purposes, this row may be designated row AA. Embodiments with keys (actuators) partially or wholly intersecting row AA may then have transversely activated non-alphanumeric keys (actuators) located partially or wholly intersecting columns anywhere between AA01 and AA12. The transversely activated non-alphanumeric keys (actuators) shown herein may be located in whole or in part in any other row of a keyboard having alphanumeric keys conforming to the ISO standards keyboard, i.e., rows B,C,D,E. As used herein the term "ISO standards" or "international standards" shall refer to ISO (international) standards proposed as of the date of filing of the present application or to ISO (international) standards which are eventually accepted.

Any device which comprises any one or more key(s), similar mechanism(s), or other actuators on a standard alphanumeric keyboard with keys in touch typing position wherein one or more non-alphanumeric functions may be activated by pressure other than downwards on said actuator(s) comprises the invention. It also comprises any of the embodiments expressed or implied herein wherein any of such actuators may be ergonomically activated by one or more thumbs with the hands in touch typing position. Further, it comprises any such transversely actuable actuator within reach of either thumb or both thumbs with the hands in touch typing position.

Any device which comprises more than one cursor movement function in a single actuator simply by pressing said actuator in different directions, or which comprises placement of one or more of said cursor movement actuators in the proximity of one or more thumbs of a touch typist on a standard alphanumeric keyboard such that one or more thumbs can comfortably activate at least one of said actuators with minimal movement is comprised by the present invention. Any standard alphanumeric keyboard with keys in touch typing position wherein any cursor movement or page up or page down function is activated by pressure on a key or other type of actuator other than in a downward direction is also comprised by the present invention. Further, the invention comprises any transversely activated actuator(s) effecting non-alphanumeric functions such as cursor movement or other non-alphanumeric functions which are adjacent to or within one row of the spacebar.

The words pressure or force when used herein as applied to a key, lever, or other type of actuator may also be interpreted as movement or touch. Also, for a given function, pressure may be applied in any direction and is not restricted to right, left, forward, backward, and down directions. As an example, upward cursor movement may be effected by a pressure which is directed half way between the left (negative "X" direction) and the forward ("Y" direction) directions at a 45° angle to both.

Combinations of embodiments are also comprised by the invention. Further, a transversely activated key (or lever or other type of actuator) may also function as an alphanumeric key. For example, forward ("Y" direction) pressure on the alphanumeric key effecting the number 1 (when pressure is downwards), may result in the specific function key F1; forward pressure on the "2" key may effect F2; on the "3" key, F3, etc. (The term "specific function" used herein throughout refers to one of the particular key functions of F1, F2, . . . , F12, etc.) As another example, forward pressure on one or more of the number keys may effect any other non-alphanumeric function such as cursor right, cursor left, cursor up, cursor down, home, end, backspace/erase, delete, insert, backslash, caps lock, tab, control, all, caps lock, and/or escape.

Although cursor movement actuators as described herein are typically intended to provide discrete cursor movement such as that provided by the traditional cursor movement keys, said actuators may also (or instead) provide continuous cursor movement similar to that provided by the mouse device of well known prior art.

The terms "key", "lever", and "joy stick" are not restrictive and any mechanism or other actuator means which effects the same or similar effect may be used in any embodiment of the invention. Any shape, size, or material for said elements is likewise comprised by the invention. Further, any keyboard utilizing the invention may be programmable or changeable by means of switching or otherwise such that the function(s) performed by any one of the actuators shown in this invention may be changed to suit the desire of the typist. As one example, the functions of key 70 in FIG. 5 may be alterable by the user such that said key takes on the function of key 72, and vice versa. As another example, the user may have a choice between the configurations of FIG. 4 and FIG. 5, and may activate such choice by a command input on the screen or by mechanical setting of a switch or similar device or by any other means. In Embodiment 10 (one variation of which is shown in FIG. 11), the user might choose between any of a wide number of programmable or switchable options. Such means for programming and/or switching functions of different actuators is widely known, utilized extensively in the art, and may be readily implemented by those skilled in the art. Any allocation of any of the functions described herein to any of the keys, levers, or other actuators described herein is comprised by the invention.

Accordingly, the scope of the invention should be determined not by the embodiments described, but by the appended claims and their legal equivalents.

I claim:

1. A keyboard for a computer, electronic typewriter, word processor, and the like comprising:

a plurality of alphanumeric keys comprising at least twenty-six alphabetic keys and ten numeric keys arranged corresponding to touch typing position each of which alphanumeric keys automatically types a different alphanumeric character in response to downward actuation thereof; and at least one cursor control actuator movable transversely for automatically effecting a cursor control function in response to actuation thereof, and at least one space bar positioned within reach of a thumb of a touch typist having hands and fingers positioned on the keyboard in touch typing position, wherein said cursor control actuator is positioned outside of the area occupied by said plurality of alphanumeric keys in the row of said space bar and within reach of at least one thumb of the touch typist having hands and fingers positioned on the keyboard in touch typing position.

2. The keyboard of claim 1 wherein
said at least one cursor control actuator has sufficiently greater height than said at least one space bar to enable transverse actuation of said cursor control actuator by touch applied to a side other than a top face of said cursor control actuator.

3. The keyboard of claim 1 wherein
said at least one cursor control actuator comprises two transversely actuable actuators, one located on either side of said at least one spacebar.

4. The keyboard of claim 1 wherein
said at least one cursor control actuator comprises two transversely actuable actuators, and
the two transversely actuable actuators comprise a first transversely actuable actuator which causes a cursor to move leftward when touch is applied on one side of said first transversely actuable actuator and to move in one of the upward and downward directions when touch is applied on a second side of said first transversely actuable actuator, and
a second transversely actuable actuator which causes a cursor to move rightward when touch is applied on one side of said second transversely actuable actuator, and to move in one of the upward and downward directions when touch is applied on a second side of said second transversely actuable actuator.

5. The keyboard of claim 4 wherein
the first transversely actuable actuator causes another function to be effected when touch is applied to a third side of the first transversely actuable actuator, and
the second transversely actuable actuator causes another function when touch is applied to a third side of the second transversely actuable actuator.

6. The keyboard of claim 1 wherein
said at least one cursor control actuator is a key.

7. The keyboard of claim 1 wherein
said at least one cursor control actuator is a lever.

8. The keyboard of claim 1 wherein
said at least one cursor control actuator comprises means for activation of at least two different functions by applying pressure on at least two different sides of said actuator.

9. The keyboard of claim 1 wherein
said at least one cursor control actuator comprises means for activation of at least three different functions by applying pressure on at least three different sides of said actuator.

10. The keyboard of claim 1 wherein
said at least one cursor control actuator is located to the left of, and within reach of, a left thumb of the touch typist.

11. The keyboard of claim 1 wherein
said at least one cursor control actuator is located to the right of, and within reach of, a right thumb of the touch typist.

12. The keyboard of claim 1 wherein
at least one of said at least one cursor control actuator is located to the right of, and within reach of, a right thumb of the touch typist and
at least one of said at least one cursor control actuator is located to the left of, and within reach of, a left thumb of the touch typist.

13. The keyboard of claim 1 wherein
at least one of said at least one cursor control actuator comprises means for effecting a cursor right function.

14. The keyboard of claim 1 wherein
at least one of said at least one cursor control actuator comprises means for effecting a cursor left function.

15. The keyboard of claim 1 wherein
at least one of said at least one cursor control actuator comprises means for effecting a cursor up function.

16. The keyboard of claim 1 wherein
at least one of said at least one cursor control actuator comprises means for effecting a cursor down function.

17. The keyboard of claim 1 wherein
at least one of said at least one cursor control actuator comprises means for effecting a home function.

18. The keyboard of claim 1 wherein
at least one of said at least one cursor control actuator comprises means for effecting an end function.

19. The keyboard of claim 1 wherein
the arrangement of alphanumeric keys conforms to ISO standards row and column designation standards, and
at least part of the cursor control actuator is located in row A.

20. The keyboard of claim 1 wherein
said at least one cursor control actuator comprises at least two such cursor control actuators wherein one such cursor control actuator is located within reach of a left thumb of the touch typist, and another such cursor control actuator is located within reach of a right thumb of the touch typist.

21. The keyboard of claim 1 wherein
at least one of said at least one cursor control actuator is located within reach of both thumbs of the touch typist.

22. The keyboard of claim 1 wherein
said at least one cursor control actuator comprises first and second transversely actuable actuators wherein the first transversely actuable actuator is located to the right of, and within reach of, a right thumb of the touch typist and said first transversely actuable actuator effects a cursor right function in response to actuation thereof in a rightward direction, and the second transversely actuable actuator is located to the left of, and within reach of, a left thumb of the touch typist and said second transversely actuable actuator effects a cursor left function in response to actuation thereof in a leftward direction.

23. The keyboard of claim 1 wherein
the cursor control actuator effects cursor motion in effectively continuous movement.

24. The keyboard of claim 1 wherein
the cursor control actuator effects cursor motion in effectively discrete movements.

25. The keyboard of claim 1 wherein
a backspace/erase key is located within reach of at least one thumb.

26. The keyboard of claim 1 wherein
touch applied on a first side of one of the at least one transversely actuable actuators causes a cursor to move leftward, and touch applied on a second side of said transversely actuable actuator causes the cursor to move rightward.

* * * * *